United States Patent
Matsushima et al.

(10) Patent No.: US 8,905,178 B2
(45) Date of Patent: Dec. 9, 2014

(54) SADDLE-RIDE-TYPE VEHICLE

(71) Applicant: Honda Motor Co., Ltd., Tokyo (JP)

(72) Inventors: Satoshi Matsushima, Wako (JP); Hirotsugu Ishizaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/864,872

(22) Filed: Apr. 17, 2013

(65) Prior Publication Data
US 2013/0313034 A1   Nov. 28, 2013

(30) Foreign Application Priority Data

May 28, 2012  (JP) ................................ 2012-121054

(51) Int. Cl.
| | |
|---|---|
| *B62K 11/00* | (2006.01) |
| *B62M 7/00* | (2010.01) |
| *F02M 35/16* | (2006.01) |
| *F16F 7/00* | (2006.01) |
| *B60K 13/02* | (2006.01) |
| *F02M 35/02* | (2006.01) |
| *F02M 35/12* | (2006.01) |

(52) U.S. Cl.
CPC .............. *B62K 11/00* (2013.01); *F02M 35/162* (2013.01); *F16F 7/00* (2013.01); *B60K 13/02* (2013.01); *F02M 35/0201* (2013.01); *F02M 35/1272* (2013.01)
USPC .......................................... 180/219; 180/227

(58) Field of Classification Search
USPC .......... 180/219, 225, 227, 228, 229, 230, 231
See application file for complete search history.

(56) References Cited

U.S. PATENT DOCUMENTS

| | | | | |
|---|---|---|---|---|
| 5,145,023 A * | 9/1992 | Tsurumi et al. | ............... | 180/68.1 |
| 5,921,214 A | 7/1999 | Fujita et al. | | |
| 7,165,524 B2 * | 1/2007 | Amino | ...................... | 123/184.31 |
| 7,861,815 B2 * | 1/2011 | Ono et al. | ...................... | 180/219 |
| 2008/0121453 A1 * | 5/2008 | Koike | ............................ | 180/219 |
| 2008/0236918 A1 | 10/2008 | Hanafusa et al. | | |
| 2009/0242305 A1 * | 10/2009 | Asano | ............................ | 180/225 |
| 2010/0133033 A1 * | 6/2010 | Schmidt et al. | ............... | 180/219 |
| 2011/0155495 A1 * | 6/2011 | Matsuda et al. | ............... | 180/219 |
| 2012/0285762 A1 * | 11/2012 | Weicheng | ...................... | 180/219 |
| 2012/0318599 A1 * | 12/2012 | Orpen et al. | ................... | 180/219 |

FOREIGN PATENT DOCUMENTS

JP         59-10383 Y2    4/1984

* cited by examiner

*Primary Examiner* — Joseph M Rocca
*Assistant Examiner* — Marc A Scharich
(74) *Attorney, Agent, or Firm* — Birch, Stewart, Kolasch & Birch, LLP

(57) ABSTRACT

A technique for suppressing vibrations generated in an air cleaner thus suppressing noise caused by the vibrations to a low level while reducing an increase in the number of parts. A motorcycle includes a seat frame, an air cleaner mounted on the seat frame and a body cover for covering the outside of the air cleaner. The body cover includes an upper body cover and a lower body cover formed by vertically dividing the body cover on a side of the air cleaner. An elastic member is sandwiched between the lower body cover and a side wall of the air cleaner. A wall member for partitioning the elastic member and a muffler from each other is mounted on the lower body cover.

20 Claims, 7 Drawing Sheets

SADDLE-RIDE-TYPE VEHICLE

CROSS-REFERENCE TO RELATED APPLICATIONS

The present application claims priority under 35 USC 119 to Japanese Patent Application No. 2012-121054 filed May 28, 2012 the entire contents of which are hereby incorporated by reference.

BACKGROUND OF THE INVENTION

1. Field of the Invention

The present invention relates to a countermeasure taken against noise generated in a saddle-ride-type vehicle.

2. Description of Background Art

Conventionally, various types of countermeasures are taken against noise generated by an engine mounted on a saddle-ride-type vehicle. An exhaust system or an intake system of the engine or the like constitutes a noise generating source. Among the countermeasures taken against noise generated in the intake system, there has been proposed a technique wherein vibrations generated in an air cleaner is reduced. See, for example, JP-UM-B-59-10383 (FIG. 1).

As shown in FIG. 1 of JP-UM-B-59-10383, a cover (15) is mounted on a bottom of an air cleaner (1) (numerals with parenthesis indicating symbols described in JP-UM-B-59-10383, this manner of indication being applicable hereinafter), and a damping material (18) and a pressing plate (19) are arranged inside the cover (15) in this order. Noise caused by vibrations of the cover of the air cleaner generated during an intake time can be damped by damping the vibrations using the vibration damping material (18).

In the technique disclosed in JP-UM-B-59-10383, the pressing plate is added to the bottom plate so that the number of parts is increased. Since the number of parts is increased, the number of man-hours relating to the assembly of the parts is also increased.

It is desirable to develop a technique that can suppress vibrations generated in an air cleaner thus suppressing noise caused by the vibrations to a low level while avoiding an increase in the number of parts.

SUMMARY AND OBJECTS OF THE INVENTION

It is an object of an embodiment of the present invention to provide a technique for suppressing vibrations generated in an air cleaner thus suppressing noise caused by the vibrations to a low level while avoiding an increase in the number of parts.

According to an embodiment of the present invention, a saddle-ride-type vehicle includes a vehicle body frame; an engine mounted on the vehicle body frame; a front wheel and a rear wheel arranged in front of and behind the engine respectively and a seat arranged between the front wheel and the rear wheel and on which a rider sits. A box-shaped air cleaner is mounted on the vehicle body frame for filtrating air taken through an air intake port by an element and for supplying the air filtrated by the element into the engine through a connecting tube. A body cover covers the outside of the air cleaner with an elastic member being sandwiched between a wall of the air cleaner and the body cover.

According to an embodiment of the present invention, an upper surface of a cleaner case of the air cleaner is opened thus forming the air intake port. The air cleaner is arranged below the seat with a predetermined gap therebetween. The body cover extends downwardly with surfaces formed substantially contiguously with side surfaces of the seat and with the elastic member covering upper portions of left and right side walls of the air cleaner.

According to an embodiment of the present invention, the elastic member is adhered to the body cover with the elastic member being brought into contact with and being collapsed by the air cleaner. The body cover is fastened to the vehicle body frame in a collapsed state.

According to an embodiment of the present invention, a muffler extending along the air cleaner is connected to a rear end of an exhaust pipe that extends from the engine. The muffler extends on one side out of left and right sides in the vehicle widthwise direction. The elastic member is arranged on a side where the muffler is arranged in the vehicle widthwise direction.

According to an embodiment of the present invention, the rear wheel is arranged behind and below the air cleaner, a wheel house for covering the rear wheel is constituted of a rear lower surface of the air cleaner, a rear fender that extends rearwardly in the longitudinal direction of the vehicle contiguously with the rear lower surface of the air cleaner, and inner surfaces of the left and right body covers in the vehicle widthwise direction that are arranged outside the rear lower surface of the air cleaner and the rear fender in the vehicle widthwise direction. The wheel house prevents water and mud splashed by the rear wheel from being scattered upwardly. A wall member partitioning the wheel house and the elastic member from each other is mounted on the body cover.

According to an embodiment of the present invention, the body cover covers the muffler, and the wall member partitions the muffler and the elastic member from each other.

According to an embodiment of the present invention, the vehicle body frame includes a main frame extending obliquely downwardly and toward a rear side of the vehicle, and a seat frame for supporting the seat. The seat frame includes a pair of left and right seat rails extending rearwardly and approximately horizontally from the main frame for supporting the seat. A pair of left and right support frames are provided that respectively extend obliquely downwardly toward the main frame from rear portions of the pair of left and right seat rails thus reinforcing the seat rails. The air cleaner is substantially accommodated in a region surrounded by the main frame, the seat rails and the support frames with the muffler extending below and substantially along the support frame outside the rear wheel in the vehicle widthwise direction and inside the body cover. The air cleaner is brought into contact with the left and right support frames from the inside in the vehicle widthwise direction. The wall member is integrally formed with the body cover, and is brought into contact with the left and right support frames from the outside in the vehicle widthwise direction.

According to an embodiment of the present invention, a saddle-ride-type vehicle is provided wherein an engine is arranged between a front wheel and a rear wheel with a fuel tank being arranged above the engine. A seat on which a rider sits extends rearwardly contiguously with an upper portion of the fuel tank. An air cleaner is arranged below the seat with a body cover extends from a lower end of the seat. The fuel tank and the air cleaner are covered with the body cover, wherein the body cover includes an upper body cover and a lower body cover formed by vertically dividing the body cover on a side of the air cleaner. The upper body cover is mounted on the air cleaner by a fastening member from a front side of a vehicle, the lower body cover is mounted on a vehicle body frame from a side of the vehicle, and an elastic member is sandwiched between the lower body cover and a side wall of the air cleaner.

According to an embodiment of the present invention, the saddle-ride-type vehicle is further provided with a rear fender that prevents mud and water splashed by the rear wheel from being scattered upwardly. The rear fender includes a front-side rear fender for covering a front side of the rear wheel and a rear-side rear fender extending rearwardly in the longitudinal direction of the vehicle contiguously with the front-side rear fender and covers the rear wheel from above. A bottom portion of the air cleaner is constituted by the front-side rear fender. Side walls of the air cleaner are constituted by left and right lower-side side walls that extend upwardly from left and right ends of the front-side rear fender. The elastic member is sandwiched between the lower body cover whose size in the height direction is larger than a corresponding size of the upper body cover and the lower-side side wall.

According to an embodiment of the present invention, the elastic member is sandwiched between the wall of the air cleaner and the body cover. Air is taken into the air cleaner at intake timing of the engine, and the flow of air stops at other timings. Accordingly, waves are generated in air taken into the air cleaner. A pressure is intermittently applied to the wall of the air cleaner due to these waves thus giving rise to a case where the wall of the air cleaner vibrates.

In this respect, according to an embodiment of the present invention, the elastic member is sandwiched between the wall of the air cleaner and the body cover. Accordingly, the wall of the air cleaner is pressed by the elastic member. Thus, the vibrations generated in the wall of the air cleaner are suppressed to a low level. The number of parts necessary for mounting the elastic member is not increased. As a result, it is possible to suppress vibrations generated in the wall of the air cleaner thus suppressing noise caused by the vibrations to a low level while avoiding an increase in the number of parts.

According to an embodiment of the present invention, the elastic member is arranged on the upper portions of the side walls of the air cleaner with the upper portions of the left and right side walls of the air cleaner being covered with the body cover from above.

The side walls of the air cleaner in the vicinity of the air intake port have upper ends thereof opened so as to form the air intake port. Thus, vibrations are liable to be generated compared to other portions. By sandwiching the elastic member at the upper portions of the side walls of the air cleaner where vibrations are liable to be generated, a vibration damping effect can be enhanced.

According to an embodiment of the present invention, the body cover is fastened to the vehicle body frame in a state where the elastic member is brought into contact with and is collapsed by the air cleaner. In fastening the body cover to the vehicle body frame, it is sufficient to collapse the elastic member. Thus, the assembling property is not significantly damaged.

Further, the elastic member is adhered to the body cover side. Accordingly, in assembling the body cover into a vehicle body, compared to a case where the air cleaner to which the elastic member is adhered is assembled into the vehicle body, the elastic member hardly becomes an obstacle at the time of assembling the body cover into the vehicle body so that the assembling property is enhanced. Further, the elastic member is mounted between the body cover and the air cleaner in a sandwiched manner. Thus, the influence on a mounting state of the elastic member caused by the deterioration of an adhesive material is small so that the positional displacement of the elastic member which may be generated over time hardly occurs.

According to an embodiment of the present invention, exhaust noise is added to noise caused by the vibrations of the air cleaner on a side where the muffler is arranged in the vehicle widthwise direction. Thus, the total noise is increased. According to an embodiment of the present invention, the elastic member is arranged on the side where the muffler is arranged. Thus, the total noise can be reduced more effectively.

According to an embodiment of the present invention, the body cover is provided with the wall member. The wheel house and the elastic member are partitioned from each other by the wall member. Thus, it is possible to prevent water or mud from getting into the elastic member. As a result, the deterioration of the elastic member by water or mud can be suppressed.

According to an embodiment of the present invention, the wall member partitions the muffler and the elastic member from each other. The muffler and the elastic member are partitioned from each other by the wall member. Thus, it is possible to make it difficult for the heat of the muffler to be transmitted to the elastic member. As a result, the deterioration of the elastic member caused by heat can be suppressed.

According to an embodiment of the present invention, the wall member which extends toward the support frame and is brought into contact with the support frame is integrally formed with the body cover. With the use of the wall member integrally formed with the body cover, it is possible to partition the wheel house and the elastic member from each other and also to partition the muffler and the elastic member from each other without increasing the number of parts.

According to an embodiment of the present invention, the lower body cover is mounted on the vehicle body frame from a side of the vehicle. By making use of the lower body cover which is mounted on the vehicle body frame from the side of the vehicle, the elastic member is sandwiched between the lower body cover and the air cleaner. Due to the elastic member being sandwiched between the lower body cover and the air cleaner, vibrations generated in the air cleaner can be suppressed to a low level.

In this case, using the lower body cover that is mounted from the side of the vehicle instead of using the upper body cover that is mounted from a front side of the vehicle, the elastic member is sandwiched between the air cleaner and the body cover. When the elastic member is sandwiched between the upper body cover and the air cleaner, the fastening direction and the sandwiching direction largely differ from each other. Thus, the assembling becomes complicated.

In this respect, according to an embodiment of the present invention, the elastic member is sandwiched using the lower body cover that is mounted from the side of the vehicle. Since the fastening direction and the sandwiching direction are the same, the elastic member can be easily mounted on an outer side of the air cleaner so that the number of man-hours for assembly can be reduced. By mounting the elastic member by sandwiching, an increase in the number of parts necessary for mounting the elastic member can be avoided so that the number of man-hours for assembly can be reduced. Thus, vibrations generated in the air cleaner can be suppressed to a low level.

According to an embodiment of the present invention, the elastic member is sandwiched between the lower body cover having a size in the height direction larger than a corresponding size of the upper body cover and the lower side wall of the air cleaner. By sandwiching the elastic member using the lower body cover having a size in the height direction larger than the corresponding size of the upper body cover, the elastic member can exhibit a vibration damping effect efficiently.

Further, the bottom portion of the air cleaner and the side wall of the air cleaner are configured to function also as the front-side rear fender. Since the air cleaner also functions as the rear fender, it is possible to avoid an increase in the number of parts while increasing an area of a portion of the rear fender which covers the rear wheel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
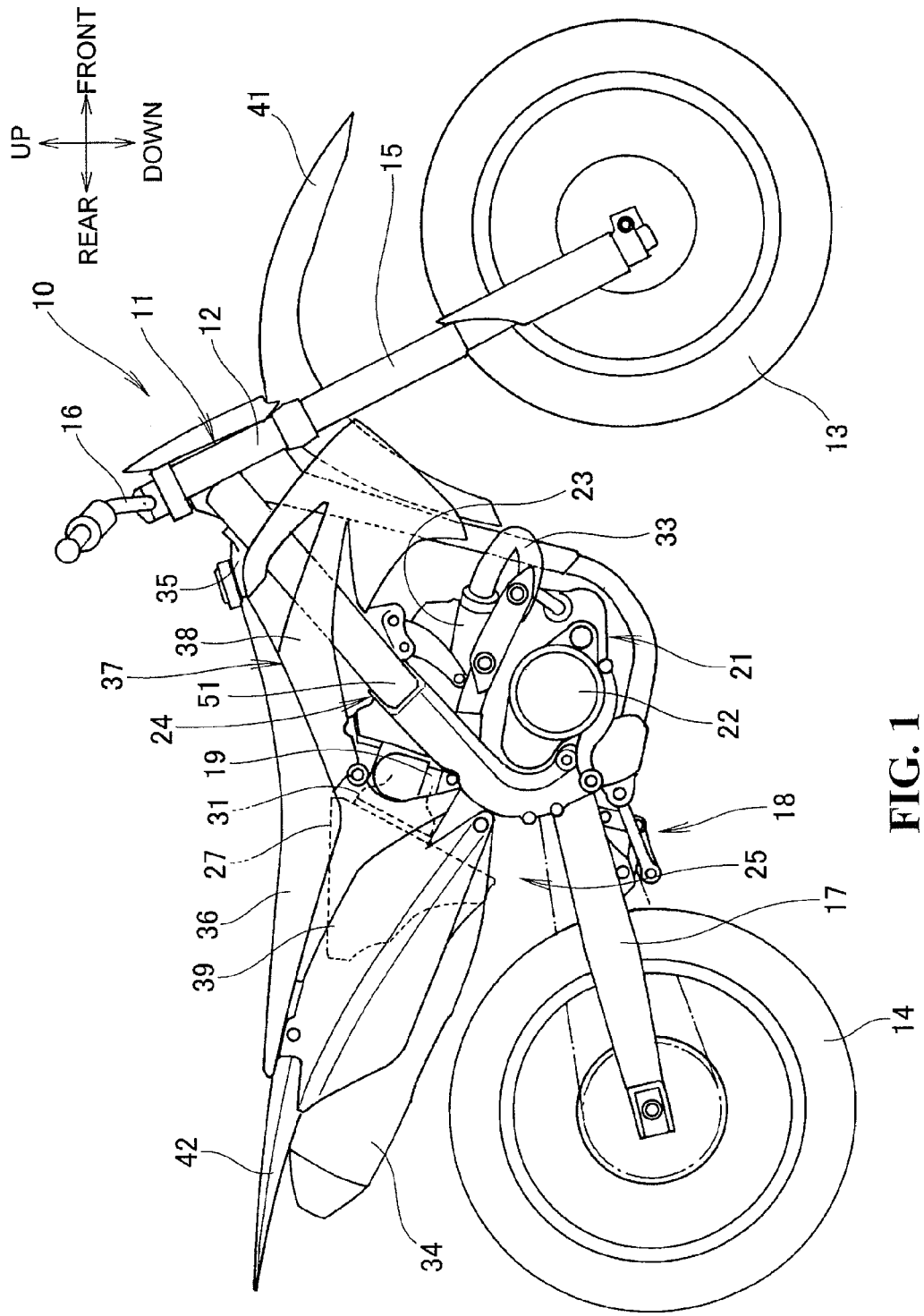
FIG. 1 a right side view of a motorcycle according to the present invention.

Hereinafter, an embodiment of the present invention is explained in detail. In the drawings and the embodiment, "up," "down," "front," "rear," "left" and "right" respectively indicate directions as viewed from a rider who rides on a motorcycle.

As shown in FIG. 1, a motorcycle 10 includes, as main components thereof, a vehicle body frame 11, a front fork 15 mounted on a front end of the vehicle body frame 11 for supporting a front wheel 13 with a handlebar 16 mounted on an upper end of the front fork 15 wherein a rider can perform a steering manipulation of the front wheel 13 by turning the handlebar 16. A rear swing arm 17 extends toward a rear side of a vehicle from the vehicle body frame 11 and supports a rear wheel 14. A link mechanism 18 and a rear shock absorber 19 are interposed between the rear swing arm 17 and the vehicle body frame 11 and swingably support the rear swing arm 17. An engine 21 is mounted on the vehicle body frame 11 between the front wheel 13 and the rear wheel 14 and constitutes a prime mover. The motorcycle 10 is a saddle-ride-type vehicle suitable for traveling on an off-road.

The front fork 15 supports the front wheel 13 and is steerably mounted on a head pipe 12 mounted on a front end of the vehicle body frame 11. The rear wheel 14 is rotatably mounted on a rear end of the rear swing arm 17 in the longitudinal direction of the vehicle.

The engine 21 is constituted of a crankcase 22 with a cylinder portion 23 extending upwardly from the crankcase 22. An intake system 24 is arranged behind the cylinder portion 23 in the longitudinal direction of the vehicle and is connected to the cylinder portion 23 from behind in the longitudinal direction of the vehicle. An exhaust system 25 is connected to the cylinder portion 23 from a front side in the longitudinal direction of the vehicle and extends to the rear side of the vehicle as a whole.

The intake system 24 includes a box-shaped air cleaner 27 for cleaning air, and a connecting tube 31 extending from the air cleaner 27 and being connected to the cylinder portion 23 of the engine 21 so as to supply cleaned air to the engine 21.

The exhaust system 25 includes an exhaust pipe 33 extending toward a front side from the engine 21 and changing the direction thereof and extending rearwardly and a muffler 34 connected to a rear end of the exhaust pipe 33. The muffler 34 extends along the air cleaner 27. The muffler 34 is connected to the rear end of the exhaust pipe 33 and extends along one side (right side) out of left and right sides in the vehicle widthwise direction.

A fuel tank 35 is mounted on the vehicle body frame 11 behind the head pipe 12 in the longitudinal direction of the vehicle. The fuel tank 35 is arranged above the engine 21 with a seat 36 on which a rider sits being configured to extend rearwardly contiguously with an upper portion of the fuel tank 35. The seat 36 is arranged between the front wheel 13 and the rear wheel 14. The air cleaner 27 is arranged below the seat 36. A body cover 37 covers the sides of the vehicle and extends from a lower end of the seat 36. The body cover 37 covers the fuel tank 35 and the air cleaner 27.

The body cover 37 includes a front portion body cover 38 for covering a front upper portion of a vehicle body, and a rear portion body cover 39 extending toward the rear side of the vehicle contiguously with the front portion body cover 38 for covering a rear upper portion of the vehicle body.

A front fender 41 for preventing mud splashed by the front wheel 13 from being scattered is mounted on the front fork 15. A rear fender 42 for preventing mud splashed by the rear wheel 14 from being scattered extends rearwardly in the longitudinal direction of the vehicle contiguously with the rear portion body cover 39.

Figure 2:
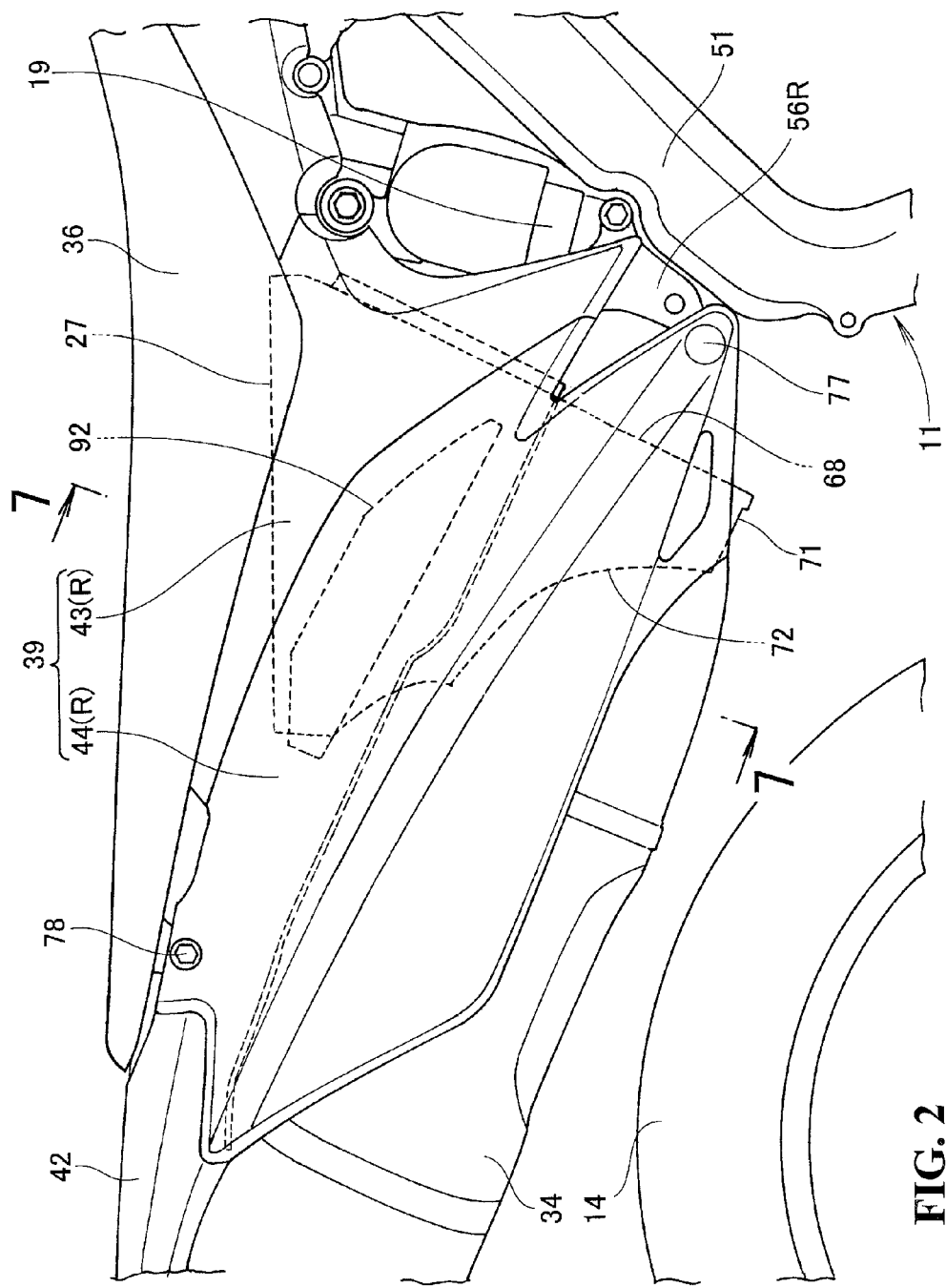
FIG. 2 an enlarged view of an essential part of the motorcycle shown in FIG. 1.

As shown in FIG. 2, the rear portion body cover 39 for covering sides of the air cleaner 27 below the seat 36 (hereinafter simply referred to as "body cover 39") includes an upper body cover 43 and a lower body cover 44 that are vertically divided on the sides of the air cleaner 27. The muffler 34 is arranged between an inner side of the lower body cover 44 in the vehicle widthwise direction and the air cleaner 27. The rear wheel 14 is arranged behind and below the air cleaner 27.

Figure 3:
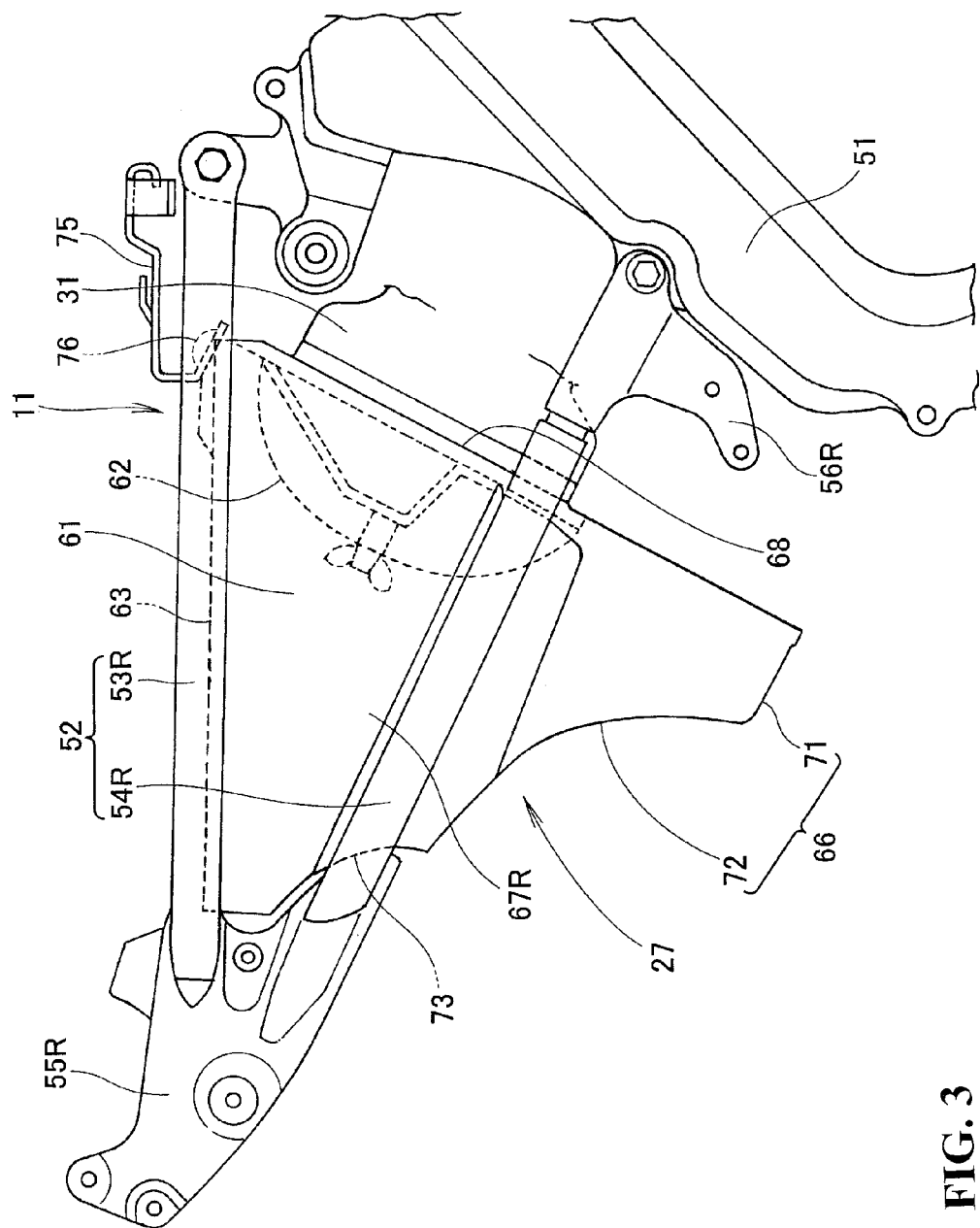
FIG. 3 a view showing a state where a body cover (lower body cover) and exhaust system members are removed from the constitution shown in FIG. 2.

As shown in FIG. 3, the vehicle body frame 11 includes a main frame 51 extending obliquely downwardly toward the rear side in the longitudinal direction of the vehicle, and a seat frame 52 which supports the seat 36 as illustrated in FIG. 2. The seat frame 52 includes a pair of left and right seat rails 53L, 53R (showing only symbol 53R on a viewer's side in the drawing) extending rearwardly and approximately horizontally from the main frame 51 for supporting the seat 36. A pair of left and right support frames 54L, 54R (showing only symbol 54R on a viewer's side in the drawing) extends obliquely downwardly toward the main frame 51 from rear portions of the pair of left and right seat rails 53L, 53R respectively thus reinforcing the seat rails 53L, 53R. Left and right rear brackets 55L, 55R (showing only symbol 55R on a viewer's side in the drawing) connect rear ends of the pair of left and right support frames 54L, 54R and rear ends of the pair of left and right seat rails 53L, 53R with each other and on which the body cover 39 and the seat 36 are mounted. To front ends of the pair of left and right support frames 54L, 54R, left and right lower brackets 56L, 56R (showing only symbol 56R on a viewer's side in the drawing) extend approximately downwardly and on which the body cover 39 is mounted respectively are attached.

Next, the air cleaner is explained.

The air cleaner 27 includes, as main components thereof, a box-shaped air cleaner box 61, and an element 62 that is mounted in the inside of the air cleaner box 61, and is mounted on the vehicle body frame 11. An air intake port 63 is opened above the air cleaner box 61. Air taken into the air cleaner box 61 through the air intake port 63 is filtrated by the element 62, and the air filtrated by the element 62 is supplied to the engine 21 as illustrated in FIG. 1 through the connecting tube 31.

The air cleaner box 61 includes a bottom portion 66; left and right side walls 67L, 67R (showing only symbol 67R on a viewer's side in the drawing) extending upwardly from the bottom portion 66 and a front wall 68 on which the element 62 is mounted. The bottom portion 66 includes a first bottom portion 71 having a planar shape extending rearwardly from a lower end of the front wall 68; a second bottom portion 72 having a curved shape extending upwardly from the first bottom portion 71 in such a manner that the second bottom portion 72 extends obliquely rearwardly and upwardly so as to avoid the rear wheel 14; and a rear portion 73 raised from a rear end of the second bottom portion 72. As described previously, an upper surface of the air cleaner box 61 is substantially opened thus forming the air intake port 63. The air cleaner 27 having such a constitution is substantially accommodated in a region surrounded by the main frame 51, the seat rails 53L, 53R and the support frames 54L, 54R.

Next, the mounting relationship of the air cleaner is explained.

An electric part bracket 75 on which electric parts are mounted is mounted on the left and right seat rails 53L, 53R, and a front upper portion of the air cleaner 27 is fastened to a rear end of the electric part bracket 75 by rivets 76. More specifically, the front upper portion of the air cleaner 27 is mounted on the vehicle body frame 11 by way of the electric part bracket 75.

Next, the body cover which covers the sides of the air cleaner is explained.

In FIG. 2, front portions of the lower body covers 44L, 44R (showing only symbol 44R on a viewer's side in the drawing) are fastened to left and right lower brackets 56L, 56R attached to the left and right support frames 54L, 54R using screws 77, 77 (showing only symbol 77 on a viewer's side in the drawing) respectively. Rear portions of the lower body covers 44L, 44R are fastened to left and right rear brackets 55L, 55R using screws 78, 78 (showing only symbol 78 on a viewer's side in the drawing) respectively. That is, the lower body covers 44L, 44R are mounted on the vehicle body frame 11 by the fastening members from the sides of the vehicle.

Figure 4:
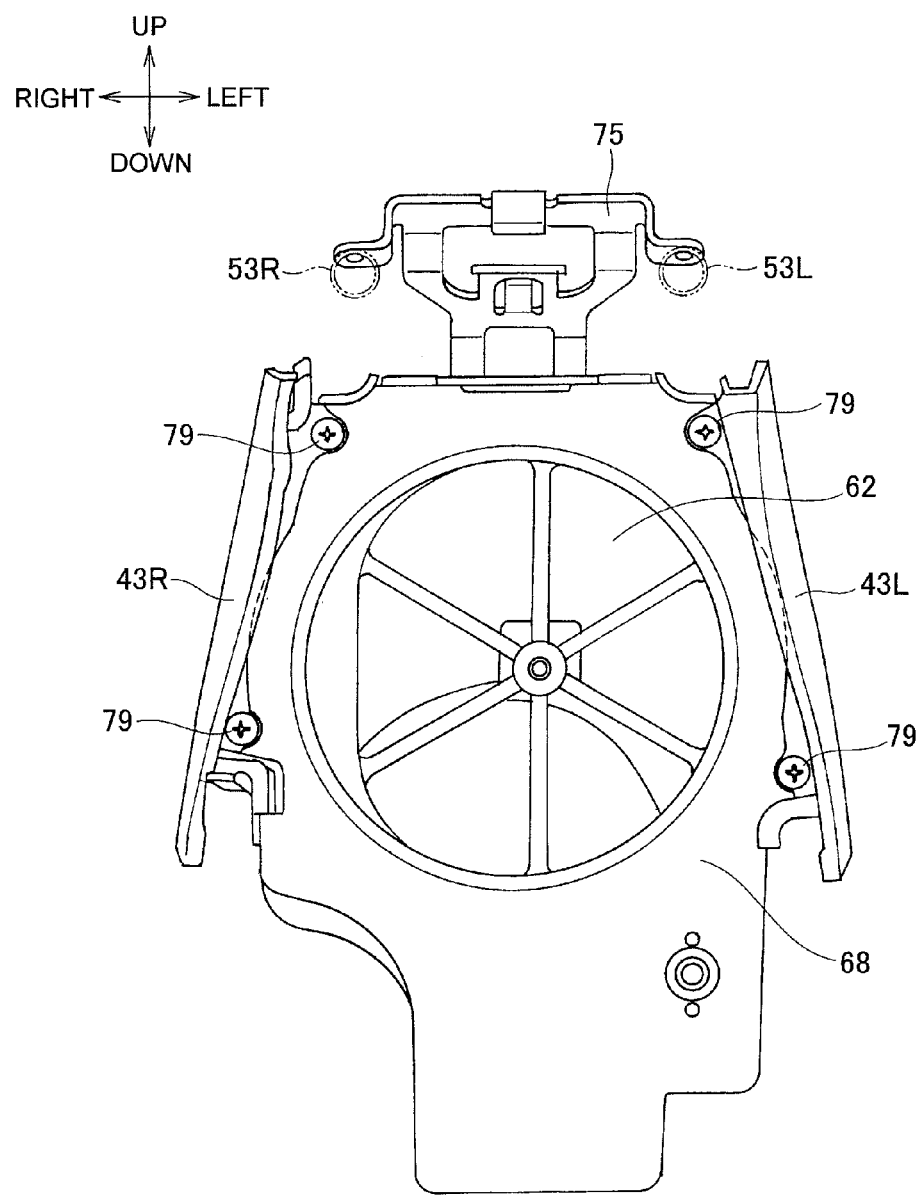
FIG. 4 an explanatory view for explaining the mounting of an upper body cover.

As shown in FIG. 4, the left and right upper body covers 43L, 43R are mounted on the front wall 68 of the air cleaner 27 by fastening members (screws 79, 79) from a front side in the longitudinal direction of the vehicle respectively.

Next, the structure of portions around the air cleaner when the body cover is removed from the vehicle body is explained.

Figure 5:
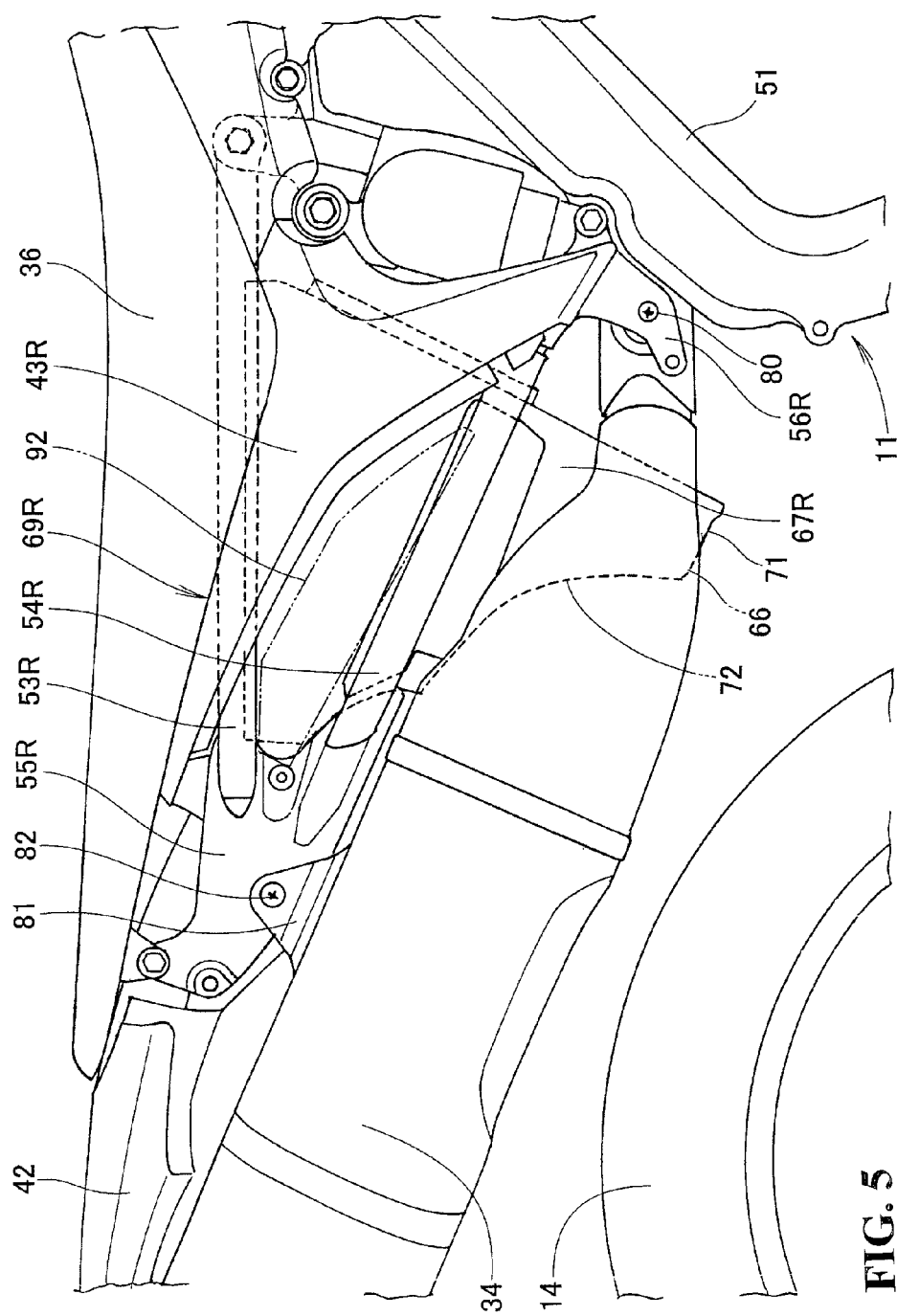
FIG. 5 a view showing a state where the exhaust system members are removed from the constitution shown in FIG. 2.

As shown in FIG. 5, the muffler 34 extends below and substantially along the support frame 54R. A rear end of the exhaust pipe 33 to which a front end of the muffler 34 is connected is fastened to the lower bracket 56R by screws 80. A stay 81, mounted on an intermediate portion of the muffler 34 in the longitudinal direction, is fastened to the rear bracket 55R by screws 82.

Next, an explanation is provided with respect to the structure where the air cleaner also functions as a portion of a wheel house for covering the rear wheel and the like.

Figure 6:
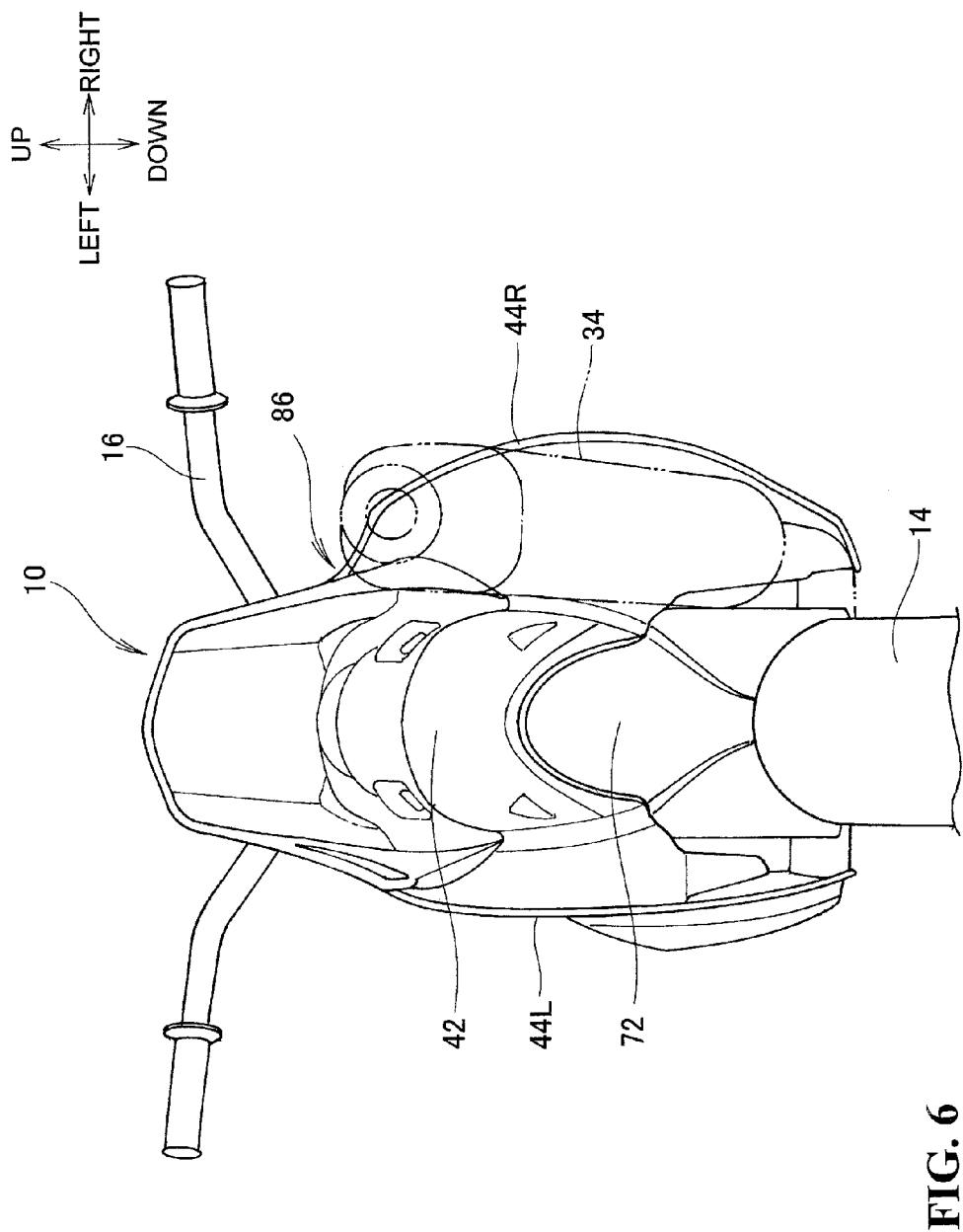
FIG. 6 a view for explaining a rear wheel house.

As shown in FIG. 6, the wheel house 86 for covering the rear wheel 14 includes a rear lower surface (second bottom portion 72) of the air cleaner; a rear-side rear fender 42 extending rearwardly in the longitudinal direction of the vehicle contiguously with a rear end of the second bottom portion 72; and the left and right lower body covers 44L, 44R arranged in an extending manner from both ends of a rear lower surface (second bottom portion 72) of the air cleaner to both ends of the rear-side rear fender 42. The wheel house 86 prevents water and mud splashed by the rear wheel 14 from being scattered upwardly. The muffler 34 is arranged outside the rear wheel 14 in the vehicle widthwise direction and inside the lower body cover 44R.

The rear fender 74 includes a front-side rear fender (second bottom portion 72) for covering a front side of the rear wheel 14 and a rear-side rear fender 42 extending rearwardly in the longitudinal direction of the vehicle contiguously with the second bottom portion 72 for covering the rear wheel 14 from above. The rear fender 74 is included in the wheel house 86.

In FIG. 5, the bottom portion 66 of the air cleaner includes the first bottom portion 71 and the second bottom portion 72 of the front-side rear fender. Side walls 69L, 69R of the air cleaner (showing only symbol 69R on a viewer's side in the drawing) include the left and right lower-side side walls 67L, 67R (showing only symbol 67R on a viewer's side in the drawing) extending from left and right ends of the first bottom portion 71 of the front-side rear fender and left and right ends of the second bottom portion 72 of the front-side rear fender, and the upper body covers 43L, 43R.

Next, the elastic member sandwiched between the air cleaner and the lower body cover and the like are explained.

Figure 7:
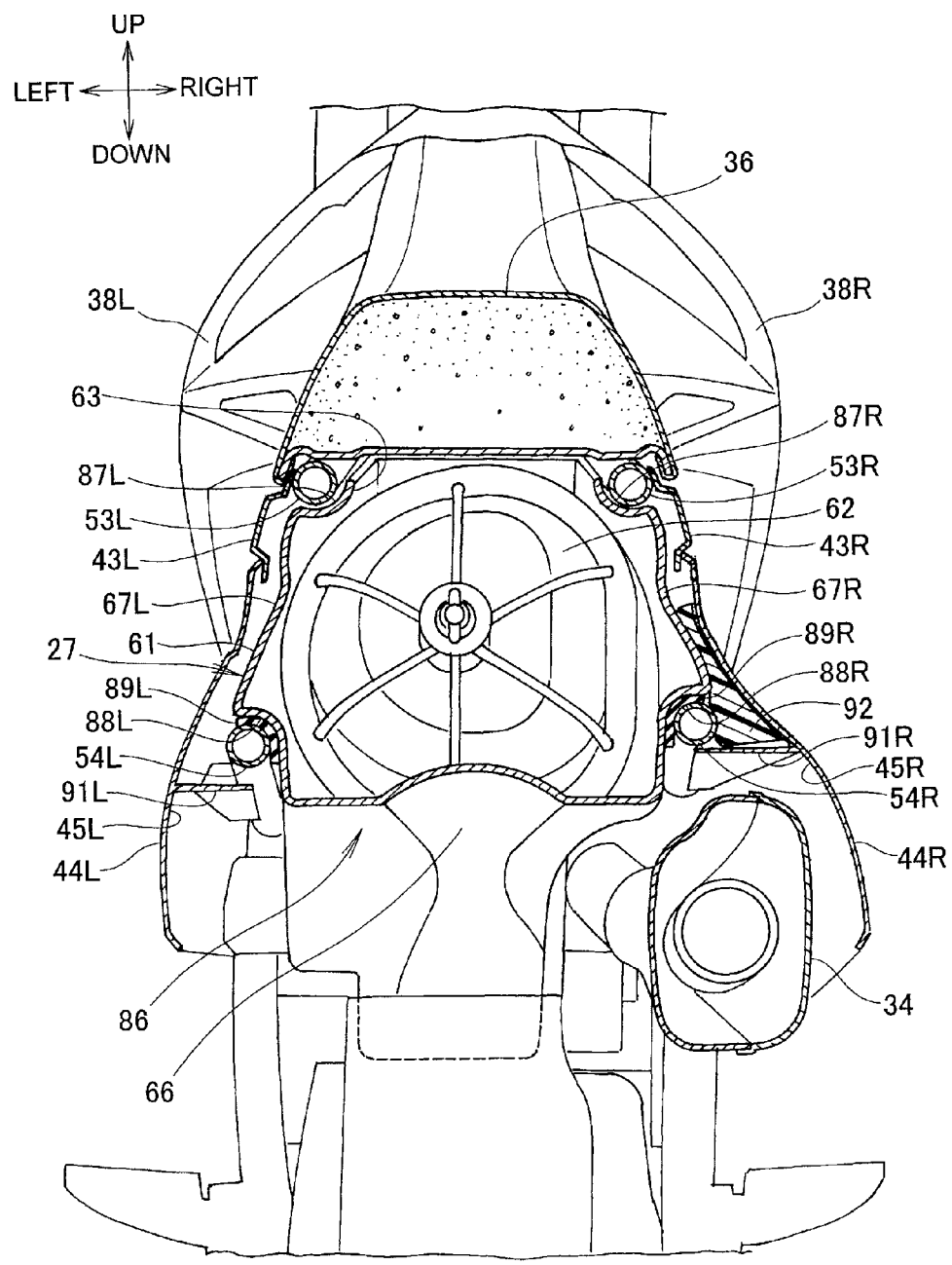
FIG. 7 a cross-sectional view taken along a line 7-7 in FIG. 2.

As shown in FIG. 7, four recessed portions 87L, 87R, 88L, 88R are formed on the side walls 67L, 67R of the air cleaner 27 at left and right sides on both upper and lower sides respectively. The air cleaner 27 is mounted on these four recessed portions 87L, 87R, 88L, 88R in such a manner that the air cleaner 27 is surrounded by the left and right seat rails 53L, 53R and the left and right support frames 54L, 54R and is sandwiched by the left and right seat rails 53L, 53R and the left and right support frames 54L, 54R. Elastic plates 89L, 89R are interposed between the left and right recessed portions 88L, 88R arranged on a lower side and the left and right support frames 54L, 54R.

The air cleaner 27 is brought into contact with the left and right support frames 54L, 54R from the inside in the vehicle widthwise direction by way of the elastic plates 89L, 89R. An outer side of the muffler 34 extending below and substantially along the support frames 54L, 54R is covered with the body cover (lower body cover 44R).

The upper body covers 43L, 43R of the body cover 39 extend downwardly respectively with surfaces substantially contiguously formed with side surfaces 46L, 46R of the seat. The lower body covers 44L, 44R extend downwardly respectively in a state wherein the lower body covers 44L, 44R are contiguously formed with lower sides of the upper body covers 43L, 43R.

Left and right wall members 91L, 91R extend from inner surfaces 45L, 45R of the lower body cover integrally with the body cover 39 in the direction toward the inside from the outside in the vehicle widthwise direction such that the left and right wall members 91L, 91R are brought into contact with the left and right support frames 54L, 54R. Above the right wall member 91R out of these left and right wall members 91L, 91R, an elastic member 92 is sandwiched between the side wall 67R of the air cleaner and the right lower body cover 44R. The wheel house (inner surface 45R of lower body cover) and the elastic member 92 are partitioned from each other by the wall member 91R.

The elastic member 92 is adhered to the inner surface 45R of the lower body cover in advance. In assembling, when the body cover (lower body cover 44R) to which the elastic member 92 is adhered is pressed from the outside the vehicle in the lateral direction at a predetermined position, the elastic member 92 is brought into contact with the air cleaner 27 and is collapsed. While maintaining such a state as it is, as described previously, the lower body cover 44R is fastened to the vehicle body frame 11. The elastic member 92 is sandwiched between the lower body cover 44R and the lower side wall 67R.

The lower body cover 44R is fastened to the vehicle body frame 11 in a state where the elastic member 92 is brought into contact with the side wall 67R of the air cleaner and is collapsed. In fastening the lower body cover 44R to the vehicle body frame 11, it is sufficient to collapse the elastic member 92. Thus, the assembling property of the lower body cover 44R is hardly deteriorated so that the favorable assembling property can be acquired.

The elastic member 92 is adhered to a lower body cover 44R side. Compared to a case where the elastic member 92 is adhered to an air cleaner 27 side, in assembling the lower body cover 44R to the vehicle body, the elastic member 92 scarcely becomes an obstacle at the time of assembling the lower body cover 44R into the vehicle body so that the assembling property can be enhanced. Further, the elastic member 92 is mounted in a state where the elastic member 92 is sandwiched between the lower body cover 44R and the air cleaner 27. Thus, a mounting state of the elastic member 92 is not influenced by the deterioration of an adhesive agent whereby there is no possibility of the occurrence of positional displacement of the elastic member 92 due to a change in property of the elastic member 92 over time.

Further, as described previously, the cleaner case (air cleaner box 61) of the air cleaner 27 has the upper surface thereof opened thus forming the air intake port 63. The air cleaner 27 having such a construction is arranged below the seat 36 with a predetermined gap therebetween.

The body cover 39 extends downwardly with surfaces substantially contiguously formed with side surfaces of the seat 36. The lower body covers 44L, 44R of the body cover 39 cover upper portions of the left and right side walls 67L, 67R of the air cleaner 27. The elastic member 92 is arranged on the upper portion of the right side wall 67R.

The side walls 67L, 67R of the air cleaner positioned in the vicinity of the air intake port 63 have upper ends thereof forming the air intake port 63 opened. Thus, the side walls 67L, 67R of the air cleaner are liable to generate vibrations compared to other parts. The elastic member 92 is sandwiched between the upper portion of the side wall 67R of the air cleaner which is liable to generate vibrations in this manner and the lower body cover 44R. Thus, a vibration damping effect can be enhanced.

The muffler 34 which extends along one side (right side) out of the left and right sides in the vehicle widthwise direction is connected to a rear end of the exhaust pipe 33 extending from the engine 21. The muffler 34 extends along the air cleaner 27. The elastic member 92 is arranged on the right side in the vehicle widthwise direction where the muffler 34 is arranged.

On the right side in the vehicle widthwise direction where the muffler 34 is arranged, exhaust noise is added to noise caused by the vibrations of the air cleaner 27. Thus, the total noise becomes large. In the present invention, the elastic member 92 is provided on the side where the muffler 34 which generates the large exhaust vibrations is arranged. Thus, the total noise can be reduced more efficiently.

The wall members 91L, 91R are formed on the body cover 39 respectively. Out of these wall members 91L, 91R, the wheel house 86 and the elastic member 92 are partitioned from each other by the right wall member 91R. Thus, it is possible to prevent an intrusion of water and mud into the elastic member 92. As a result, the deterioration of the elastic member 92 caused by water and mud can be reduced.

The lower body cover 44R covers the muffler 34, and the wall member 91R partitions the muffler 34 and the elastic member 92 from each other. Since the muffler 34 and the elastic member 92 are partitioned from each other by the wall member 91R, it is possible to make the transfer of heat of the muffler 34 to the elastic member 92 difficult. As a result, the deterioration of elastic member 92 caused by heat can be reduced.

The manner of operation of the above-mentioned muffler structure of the above-mentioned saddle-ride-type vehicle (motorcycle) is hereinafter described.

The elastic member 92 is sandwiched between the side wall 67R of the air cleaner and the right lower body cover 44. Air is taken into the air cleaner 27 at intake timing of the engine 21, and the flow of air stops at other timings. Accordingly, waves are generated in air taken into the air cleaner 27. A pressure is intermittently applied to the side walls 67L, 67R of the air cleaner due to such waves so that there may be a case where the side walls 67L, 67R of the air cleaner vibrate.

In this respect, according to an embodiment of the present invention, the elastic member 92 is sandwiched between the side wall 67R of the air cleaner and the body cover 39. Accordingly, the side wall 67R of the air cleaner is pressed by the elastic member 92. Thus, the vibrations generated in the side wall 67R of the air cleaner are suppressed to a low level. As a result, it is possible to suppress vibrations generated in the side wall 67R of the air cleaner to a low level without adding parts necessary for mounting the elastic member 92.

In this embodiment, the elastic member is sandwiched only on the side where the muffler is arranged. However, the elastic member may be sandwiched on the side where the muffler is not arranged without causing any problem.

The upper body covers 43L, 43R are mounted on the air cleaner 27 by the fastening member 79 as illustrated in FIG. 4 from a front side of the vehicle, while the lower body cover 44 is, as shown in FIG. 2, mounted on the vehicle body frame 11 from a side of the vehicle. More specifically, the body cover 39 adopts the vertical split structure and by using the lower body cover 44R mounted on the vehicle body frame 11 from the side of the vehicle by fastening members (screws 77, 78), the elastic member 92 is sandwiched between the lower body cover 44R and the air cleaner 27. The elastic member 92 is sandwiched between the lower body cover 44R which is larger in size compared to the upper body cover 43R and the air cleaner 27. Thus, the vibrations generated in the air cleaner 27 can be sufficiently suppressed to a low level.

Further, by sandwiching the elastic member 92 between the air cleaner 27 and the body cover 39 by making use of the lower body cover 44R mounted from the side of the vehicle, the elastic member 92 can be easily assembled to an outer side of the air cleaner 27. As a result, vibrations generated in the air cleaner 27 can be suppressed to a low level without increasing the number of parts.

The wall member 91L, 91R extending toward the support frame 54L, 54R and coming into contact with the support frame 54L, 54R is integrally formed with the body cover 39. With the use of the wall member 91L, 91R integrally formed with the body cover 39, it is possible to partition the wheel house 86 and the elastic member 92 from each other and also to partition the muffler 34 and the elastic member 92 from each other without increasing the number of parts.

The upper body cover 43 is mounted on the air cleaner 27 from a front side of the vehicle, while the lower body cover 44 is mounted on the vehicle body frame 11 having relatively high rigidity. The elastic member 92 is sandwiched between the lower body cover 44 mounted on the vehicle body frame 11 and having relatively high rigidity and the lower side wall 67R so that sufficient damping performance can be acquired with respect to the air cleaner 27 without applying a vibration damping measure to the upper body cover 43L, 43R.

Further, the bottom portion 66 of the air cleaner and the side wall 67L, 67R of the air cleaner are configured to function also as the front-side rear fender 42. Since the air cleaner 27 also functions as the rear fender 42, it is possible to reduce an increase in the number of parts.

Although the present invention is applied to the motorcycle in this embodiment, the present invention is also applicable to a saddle-ride-type three-wheeled vehicle, and the present invention is also applicable to a general saddle-ride-type vehicle without causing any problem.

The present invention is preferably applicable to a motorcycle with an air cleaner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride vehicle comprising:
a vehicle body frame;
an engine mounted on the vehicle body frame;
a front wheel and a rear wheel arranged in front of and behind the engine respectively;
a seat arranged between the front wheel and the rear wheel and on which a rider sits;
a box-shaped air cleaner mounted on the vehicle body frame below the seat for filtrating air taken through an air intake port by an element, and for supplying the air filtrated by the element into the engine through a connecting tube;
a body cover for covering an outside of the air cleaner, the body cover extending downwardly from side surfaces of the seat; and
an elastic member sandwiched between and contacting each of a wall of the air cleaner and the body cover to provide vibration damping between the air cleaner and the body cover.

2. The saddle-ride vehicle according to claim 1, wherein:
an upper surface of a cleaner case of the air cleaner is opened thus forming the air intake port;
the air cleaner and the seat have a predetermined gap therebetween;
surfaces of the body cover are positioned substantially contiguously with the side surfaces of the seat; and
the elastic member covers portions of at least one side wall of the air cleaner.

3. The saddle-ride vehicle according to claim 1, wherein the elastic member is adhered to the body cover and is collapsed by contact with the air cleaner in a collapsed state when the body cover is fastened to the vehicle body frame.

4. The saddle-ride vehicle according to claim 2, wherein the elastic member is adhered to the body cover and is collapsed by contact with the air cleaner in a collapsed state when the body cover is fastened to the vehicle body frame.

5. The saddle-ride vehicle according to claim 1, wherein:
a muffler extending along the air cleaner is connected to a rear end of an exhaust pipe extending from the engine;
the muffler extends on one side in a vehicle widthwise direction; and
the elastic member is arranged on the body cover on the one side of the vehicle where the muffler is arranged.

6. The saddle-ride vehicle according to claim 2, wherein:
a muffler extending along the air cleaner is connected to a rear end of an exhaust pipe extending from the engine;
the muffler extends on one side in a vehicle widthwise direction; and
the elastic member is arranged on the body cover on the one side of the vehicle where the muffler is arranged.

7. The saddle-ride vehicle according to claim 3, wherein:
a muffler extending along the air cleaner is connected to a rear end of an exhaust pipe extending from the engine;
the muffler extends on one side in a vehicle widthwise direction; and
the elastic member is arranged on the body cover on the one side of the vehicle where the muffler is arranged.

8. The saddle-ride vehicle according to claim 1, wherein:
the rear wheel is arranged behind and below the air cleaner;
a wheel house for covering the rear wheel includes a rear lower surface of the air cleaner, a rear fender extending rearwardly in a longitudinal direction of the vehicle contiguously with the rear lower surface of the air cleaner, and inner surfaces of a left body cover and a right body cover in a vehicle widthwise direction are arranged outside the rear lower surface of the air cleaner and the rear fender in the vehicle widthwise direction, the wheel house preventing water and mud splashed by the rear wheel from being scattered upwardly; and
a wall member partitioning the wheel house and the elastic member from each other is mounted on the body cover.

9. The saddle-ride vehicle according to claim 2, wherein:
the rear wheel is arranged behind and below the air cleaner;
a wheel house for covering the rear wheel includes a rear lower surface of the air cleaner, a rear fender extending rearwardly in a longitudinal direction of the vehicle contiguously with the rear lower surface of the air cleaner, and inner surfaces of a left body cover and a right body cover in a vehicle widthwise direction are arranged outside the rear lower surface of the air cleaner and the rear fender in the vehicle widthwise direction, the wheel house preventing water and mud splashed by the rear wheel from being scattered upwardly; and
a wall member partitioning the wheel house and the elastic member from each other is mounted on the body cover.

10. The saddle-ride vehicle according to claim 3, wherein:
the rear wheel is arranged behind and below the air cleaner;
a wheel house for covering the rear wheel includes a rear lower surface of the air cleaner, a rear fender extending rearwardly in a longitudinal direction of the vehicle contiguously with the rear lower surface of the air cleaner, and inner surfaces of a left body cover and a right body cover in a vehicle widthwise direction are arranged outside the rear lower surface of the air cleaner and the rear fender in the vehicle widthwise direction, the wheel house preventing water and mud splashed by the rear wheel from being scattered upwardly; and a wall member partitioning the wheel house and the elastic member from each other is mounted on the body cover.

11. The saddle-ride vehicle according to claim 8, wherein the body cover covers the muffler, and the wall member partitions the muffler and the elastic member from each other.

12. The saddle-ride vehicle according to claim 5, wherein:

the vehicle body frame includes a main frame extending obliquely downwardly and toward a rear side of the vehicle, and a seat frame for supporting the seat; wherein:

the seat frame includes a pair of left and right seat rails extending rearwardly and approximately horizontally from the main frame for supporting the seat, and a pair of left and right support frames respectively extending obliquely downwardly toward the main frame from rear portions of the pair of left and right seat rails thus reinforcing the seat rails;

the air cleaner is substantially accommodated in a region surrounded by the main frame, the seat rails and the support frames;

the muffler extends below and substantially along the support frame outside the rear wheel in the vehicle widthwise direction and inside the body cover;

the air cleaner is brought into contact with an interior portion of the left and right support frames in the vehicle widthwise direction; and a wall member is integrally formed with the body cover, and is brought into contact with an outer portion of the left and right support frames in the vehicle widthwise direction.

13. The saddle-ride vehicle according to claim 6, wherein:

the vehicle body frame includes a main frame extending obliquely downwardly and toward a rear side of the vehicle, and a seat frame for supporting the seat; wherein:

the seat frame includes a pair of left and right seat rails extending rearwardly and approximately horizontally from the main frame for supporting the seat, and a pair of left and right support frames respectively extending obliquely downwardly toward the main frame from rear portions of the pair of left and right seat rails thus reinforcing the seat rails;

the air cleaner is substantially accommodated in a region surrounded by the main frame, the seat rails and the support frames;

the muffler extends below and substantially along the support frame outside the rear wheel in the vehicle widthwise direction and inside the body cover;

the air cleaner is brought into contact with an interior portion of the left and right support frames in the vehicle widthwise direction; and a wall member is integrally formed with the body cover, and is brought into contact with an outer portion of the left and right support frames in the vehicle widthwise direction.

14. A saddle-ride vehicle wherein an engine is arranged between a front wheel and a rear wheel, a fuel tank is arranged above the engine, a seat on which a rider sits extends rearwardly contiguously with an upper portion of the fuel tank, an air cleaner is arranged below the seat, a body cover extends from a lower end of the seat, and the fuel tank and the air cleaner are covered with the body cover, wherein:

the body cover includes an upper body cover and a lower body cover formed by vertically dividing the body cover on a side of the air cleaner;

the upper body cover is mounted on the air cleaner by a fastening member from a front side of the vehicle;

the lower body cover is mounted on a vehicle body frame from a side of the vehicle; and an elastic member is sandwiched between and contacts each of the lower body cover and a side wall of the air cleaner.

15. The saddle-ride vehicle according to claim 14, wherein:

the saddle-ride vehicle is further provided with a rear-side rear fender for preventing mud and water splashed by the rear wheel from being scattered upwardly;

the rear-side rear fender extends rearwardly in a longitudinal direction of the vehicle contiguously with a front-side rear fender for covering a front side of the rear wheel, and covers the rear wheel from above;

a bottom portion of the air cleaner includes the front-side rear fender;

side walls of the air cleaner include left and right lower-side side walls extending upwardly from left and right ends of the front-side rear fender and the upper body cover; and the elastic member is sandwiched between the lower body cover whose size in a height direction is larger than a corresponding size of the upper body cover and the lower-side side wall.

16. A saddle-ride vehicle comprising:

an engine mounted on a vehicle body frame;

a seat on which a rider sits;

a box-shaped air cleaner mounted on the vehicle body frame for filtrating air taken through an air intake port by an element and for supplying the air filtrated by the element into the engine through a connecting tube;

a body cover for covering an outside of the air cleaner, the body cover extending downwardly with surfaces thereof positioned substantially contiguously with side surfaces of the seat; and an elastic member sandwiched between and contacting each of a wall of the air cleaner and the body cover to provide vibration damping between the air cleaner and the body cover.

17. The saddle-ride vehicle according to claim 16, wherein:

an upper surface of a cleaner case of the air cleaner is opened thus forming the air intake port;

the air cleaner is arranged below the seat with a predetermined gap therebetween; and the elastic member covers portions of at least one side wall of the air cleaner.

18. The saddle-ride vehicle according to claim 16, wherein the elastic member is adhered to the body cover, and is collapsed by contact with the air cleaner in a collapsed state when the body cover is fastened to the vehicle body frame.

19. The saddle-ride vehicle according to claim 16, wherein:

a muffler extending along the air cleaner is connected to a rear end of an exhaust pipe extending from the engine;

the muffler extends on one side in a vehicle widthwise direction; and the elastic member is arranged on the body cover on the one side of the vehicle where the muffler is arranged.

20. The saddle-ride vehicle according to claim 16, wherein:

a rear wheel is arranged behind and below the air cleaner;

a wheel house for covering the rear wheel includes a rear lower surface of the air cleaner, a rear fender extending rearwardly in a longitudinal direction of the vehicle contiguously with the rear lower surface of the air cleaner, and inner surfaces of a left body cover and a right body cover in a vehicle widthwise direction are arranged outside the rear lower surface of the air cleaner and the rear fender in the vehicle widthwise direction, the wheel house preventing water and mud splashed by the rear wheel from being scattered upwardly; and a wall member partitioning the wheel house and the elastic member from each other is mounted on the body cover.

* * * * *